(12) United States Patent
Yagi

(10) Patent No.: US 8,731,344 B2
(45) Date of Patent: May 20, 2014

(54) METHOD FOR MANUFACTURING SEMICONDUCTOR OPTICAL MODULATOR AND SEMICONDUCTOR OPTICAL MODULATOR

(75) Inventor: Hideki Yagi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 106 days.

(21) Appl. No.: 13/478,280

(22) Filed: May 23, 2012

(65) Prior Publication Data

US 2012/0308173 A1    Dec. 6, 2012

(30) Foreign Application Priority Data

Jun. 2, 2011  (JP) .................................. 2011-124299

(51) Int. Cl.
| | | |
|---|---|---|
| G02B 6/12 | (2006.01) | |
| G02B 6/10 | (2006.01) | |
| G02F 1/015 | (2006.01) | |
| H01L 21/302 | (2006.01) | |
| B29D 11/00 | (2006.01) | |
| B23B 9/04 | (2006.01) | |
| H01L 21/36 | (2006.01) | |

(52) U.S. Cl.
USPC ........ 385/14; 359/279; 257/E21.214; 216/24; 428/469; 438/503

(58) Field of Classification Search
USPC .......... 385/14, 15, 16; 257/E21.214, 488, 99, 257/94, 96, 97; 216/24, 37; 428/469, 697, 428/704; 438/39, 503
See application file for complete search history.

(56) References Cited

U.S. PATENT DOCUMENTS

| | | | | |
|---|---|---|---|---|
| 4,809,287 | A * | 2/1989 | Ohba et al. | 372/45.01 |
| 4,949,349 | A * | 8/1990 | Ohba et al. | 372/45.01 |
| 6,117,753 | A * | 9/2000 | Hamamoto et al. | 438/503 |
| 6,667,529 | B2 * | 12/2003 | Takagi | 257/488 |
| 6,692,837 | B2 * | 2/2004 | Iga et al. | 428/469 |
| 7,159,421 | B2 * | 1/2007 | Bhandarkar et al. | 65/386 |
| 7,943,407 | B2 * | 5/2011 | Fujimoto et al. | 438/39 |
| 8,472,760 | B2 * | 6/2013 | Hashimoto | 385/14 |

OTHER PUBLICATIONS

T. H. Stievater, et al., "Enhanced Electro-Optic Phase Shifts in Suspended Waveguides", Optics Express, Jan. 18, 2010, vol. 18, No. 2, pp. 885-892.

* cited by examiner

*Primary Examiner* — Akm Enayet Ullah
(74) *Attorney, Agent, or Firm* — Smith, Gambrell & Russell, LLP

(57) ABSTRACT

A method for manufacturing a semiconductor optical modulator includes forming a p-type semiconductor layer on a main surface of a p-type semiconductor substrate; forming a pair of stripe-shaped masks on the p-type semiconductor layer, the stripe-shaped masks extending in a first direction along the main surface of the p-type semiconductor substrate and being spaced apart from each other; simultaneously forming a hole and a pair of stripe structures extending in the first direction by etching the p-type semiconductor layer through the stripe-shaped masks, the pair of stripe structures defining the hole; after removing the stripe-shaped masks, forming a buried layer in the hole; forming a core layer on the buried layer and the stripe structures; and forming an upper cladding layer on the core layer. The buried layer is made of a semiconductor material with a lower optical absorption loss than that of the p-type semiconductor layer.

13 Claims, 17 Drawing Sheets

METHOD FOR MANUFACTURING SEMICONDUCTOR OPTICAL MODULATOR AND SEMICONDUCTOR OPTICAL MODULATOR

BACKGROUND OF THE INVENTION

1. Field of the Invention

The present invention relates to methods for manufacturing semiconductor optical modulators and to semiconductor optical modulators.

2. Description of the Related Art

T. H. Stievater et. al., "Enhanced Electro-Optic Phase Shifts in Suspended Waveguides", OPTICS EXPRESS, 18 Jan. 2010, Vol. 18, No. 2, pp. 885-892 (Ref. 1) discusses a method for manufacturing a semiconductor optical waveguide for a semiconductor optical modulator. In this method for manufacturing an optical waveguide, a p-type AlInAs semiconductor layer is formed on a p-type semiconductor substrate. Then, stacked layers including a core layer are formed on the p-type semiconductor layer. The core layer has a multi-quantum well (MQW) structure. The p-type semiconductor layer and the stacked layers form an optical waveguide structure. Holes are then formed in side surfaces of the optical waveguide structure, and the p-type semiconductor layer is wet-etched through the holes in a direction from the side surfaces along the waveguiding direction. In this way, a gap extending in the waveguiding direction is formed in the p-type semiconductor layer. The gap reduces the amount of p-type semiconductor layer in the optical waveguide structure. In general, a p-type semiconductor layer has a larger optical absorption loss than that of an n-type semiconductor layer. Therefore, this, as discussed in Ref. 1, reduces an optical absorption loss in the optical waveguide structure.

In the method for manufacturing a semiconductor optical waveguide according to Ref. 1, as described above, the p-type semiconductor layer is wet-etched in a direction from the side surfaces along the waveguiding direction to reduce the amount of p-type semiconductor layer in the optical waveguide structure. In the semiconductor optical waveguide according to Ref. 1, the amount of p-type semiconductor layer is reduced to reduce an optical loss in the optical waveguide structure. When the p-type semiconductor layer is etched, additionally, it is necessary to control the etching depth and to maintain a uniform depth. One approach to controlling the etching depth is to provide an etch stop layer between the p-type semiconductor substrate and the p-type semiconductor layer. The amount of etching can be controlled in the depth direction by providing the etch stop layer. The control of the amount of etching with an etch stop layer, however, is not suitable for controlling the gap width (the width perpendicular to the waveguiding direction). Instead, the gap width is controlled depending on parameters such as the etching rate and etching time of wet etching. The gap width needs to be uniform with micron-level accuracy over the whole length of the optical waveguide, namely, several millimeters.

For the method for manufacturing a semiconductor optical waveguide by wet etching, however, it is difficult to uniformly remove the p-type semiconductor layer from the optical waveguide structure in the waveguiding direction because the gap width is controlled depending on the parameters such as the etching rate and etching time of wet etching. For the method for manufacturing a semiconductor optical waveguide according to Ref. 1, specifically, it is difficult to form a gap with a uniform shape (e.g., a uniform cross-section perpendicular to the waveguiding direction). As a result, the amount of p-type semiconductor layer removed from the optical waveguide structure varies in the waveguiding direction. This variation contributes to scattering of light propagating through the optical waveguide structure and also to increasing an optical loss due to the scattering. It is therefore difficult to sufficiently reduce an optical propagation loss in a semiconductor optical modulator including a semiconductor optical waveguide manufactured by the method as above.

SUMMARY OF THE INVENTION

A method for manufacturing a semiconductor optical modulator according to an aspect of the present invention includes the steps of forming a p-type semiconductor layer on a main surface of a p-type semiconductor substrate; forming a pair of stripe-shaped masks on the p-type semiconductor layer, the stripe-shaped masks extending in a first direction along the main surface of the p-type semiconductor substrate and being spaced apart from each other; simultaneously forming a hole extending in the first direction and a pair of stripe structures extending in the first direction by etching the p-type semiconductor layer through the stripe-shaped masks, the pair of stripe structures defining the hole and protruding in a direction crossing the main surface of the p-type semiconductor substrate; after removing the stripe-shaped masks, forming a buried layer in the hole; forming a core layer on the buried layer and the stripe structures, the core layer being made of a semiconductor material having a higher refractive index than the buried layer; and forming an upper cladding layer on the core layer, the upper cladding layer being made of an n-type semiconductor material having a lower refractive index than the core layer. In addition, the buried layer is made of a semiconductor material with a lower optical absorption loss than that of the p-type semiconductor layer.

In the method for manufacturing a semiconductor optical modulator according to this aspect, the hole is simultaneously formed in the p-type semiconductor layer in the step of forming the stripe structures. In addition, the buried layer is formed in the hole in the step of forming the buried layer. The buried layer is made of a semiconductor material with a lower optical absorption loss than that of the p-type semiconductor layer. The buried layer functions as a lower cladding. The buried layer, the upper cladding layer, and the core layer between the buried layer and the upper cladding layer constitute an optical waveguide structure. Therefore, an optical absorption loss in the optical waveguide structure is reduced.

In the method for manufacturing a semiconductor optical modulator according to this aspect, the pair of stripe-shaped masks extending in the first direction along the main surface of the p-type semiconductor substrate and spaced apart from each other are formed on the p-type semiconductor layer. The p-type semiconductor layer is etched through the stripe-shaped masks to form the hole. A shape of hole can be controlled by the pattern of stripe-shaped mask. In addition, the p-type semiconductor layer is etched in a depth direction perpendicular to the first direction, which is the waveguiding direction of the optical waveguide. Therefore, this etching process can form the hole extending in the first direction uniformly and accurately in the first direction, thus reducing an optical propagation loss in the optical waveguide due to variations in the shape of the hole.

In the method for manufacturing a semiconductor optical modulator according to this aspect, the buried layer may be made of an undoped semiconductor material, a p-type semiconductor material having a lower p-type impurity concentration than the p-type semiconductor layer, or an n-type semiconductor material having an n-type impurity concentration of $1\times10^{17}$ cm$^{-3}$ or less. The buried layer, being made of an undoped semiconductor material, a p-type semiconductor material having a lower p-type impurity concentration than the p-type semiconductor layer, or an n-type semiconductor material having an n-type impurity concentration of $1\times10^{17}$ cm$^{-3}$ or less, reduces the p-type semiconductor material region or the p-type impurity concentration as compared to the case where the hole and the buried layer are not formed. This results in reduced intervalence band absorption due to the p-type semiconductor material, thus providing a semiconductor optical modulator with a reduced optical absorption loss for light propagating through an optical waveguide structure including a core layer.

Thus, the method for manufacturing a semiconductor optical modulator according to this aspect provides a semiconductor optical modulator with a reduced optical propagation loss.

In the method for manufacturing a semiconductor optical modulator according to this aspect, the p-type semiconductor layer and the buried layer are preferably made of the same semiconductor material. Specifically, the p-type semiconductor substrate, the p-type semiconductor layer, and the buried layer may be made of InP.

In the method for manufacturing a semiconductor optical modulator according to this aspect, in the step of forming the hole and the pair of stripe structures, the p-type semiconductor layer may be etched by a reactive ion etching. The shape of the hole is controlled with a high accuracy by using the reactive ion etching. Therefore, the uniformity of the shape of the hole in the first direction is improved. In this case, an optical loss (scattering) in the optical waveguide due to variations in the shape of the hole is reduced compared to the method of forming the hole by wet etching.

In addition, the method for manufacturing a semiconductor optical modulator according to this aspect may further include a step of forming an n-electrode on the upper cladding layer and a p-electrode on a back surface of the p-type semiconductor substrate.

In the method for manufacturing a semiconductor optical modulator according to this aspect, the step of forming the buried layer preferably includes a step of forming a first buried region having a height smaller than that of the stripe structure on a side surface of the hole and the main surface of the p-type semiconductor substrate at a first growth rate; and a step of forming a second buried region on the first buried region at a second growth rate lower than the first growth rate. In addition, it is preferable that the second buried region fills the hole and covers top surfaces of the pair of stripe structures. This improves the surface flatness of the buried layer, thus further reducing an optical propagation loss in the optical waveguide.

In the method for manufacturing a semiconductor optical modulator according to this aspect, it is preferable that the buried layer fills the hole and covers top surfaces of the pair of stripe structures in the step of forming the buried layer. Thus, a flat buried layer (regrowth interface) is formed on the stripe structures. Accordingly, a flat core layer can be formed on the buried layer.

In addition, the method for manufacturing a semiconductor optical modulator according to this aspect may further include the steps of forming a ridge on the buried layer between the pair of stripe structures by etching the upper cladding layer, the ridge having a smaller width than a spacing between the pair of stripe structures; forming a protective layer on the ridge; forming an opening in the protective layer at a top surface of the ridge; and forming an n-electrode in the opening directly in contact with the top surface of the ridge.

A semiconductor optical modulator according to another aspect of the present invention includes a p-type semiconductor substrate; a pair of stripe structures disposed on a main surface of the p-type semiconductor substrate, the pair of stripe structures extending in a first direction along the main surface of the p-type semiconductor substrate and protruding in a direction crossing the main surface of the p-type semiconductor substrate, the pair of stripe structures comprising a p-type semiconductor layer; a buried layer disposed in a hole defined by the pair of stripe structures, the buried layer comprising a semiconductor material with a lower optical absorption loss than that of the p-type semiconductor layer; a core layer disposed on the buried layer, the core layer comprising a semiconductor material having a higher refractive index than the buried layer; an upper cladding layer disposed on the core layer, the upper cladding layer comprising an n-type semiconductor material having a lower refractive index than the core layer; an n-electrode disposed on the upper cladding layer; and a p-electrode disposed on a back surface of the p-type semiconductor substrate.

The semiconductor optical modulator according to this aspect includes the pair of stripe structures disposed on the p-type semiconductor substrate and the buried layer. The pair of stripe structures are made of the p-type semiconductor layer and define the hole. The buried layer is disposed in the hole. The buried layer is made of a semiconductor material with a lower optical absorption loss than that of the p-type semiconductor layer. Specifically, the buried layer may be composed of an undoped semiconductor material, a p-type semiconductor material having a lower p-type impurity concentration than the p-type semiconductor layer, or an n-type semiconductor material having an n-type impurity concentration of $1\times10^{17}$ cm$^{-3}$ or less.

A buried layer formed of such a material reduces the p-type semiconductor material region or the p-type impurity concentration as compared to the case where a p-type semiconductor layer with uniform thickness is formed on the p-type semiconductor substrate and the stacked layers including the core layer are formed thereon without forming the hole and the buried layer. This results in reduced intervalence band absorption due to the p-type semiconductor material, thus reducing an optical absorption loss for light propagating through the optical waveguide structure.

In the semiconductor optical modulator according to this aspect, the hole can be easily formed by forming a p-type semiconductor layer with uniform thickness on the p-type semiconductor substrate and etching the p-type semiconductor layer in a depth direction perpendicular to the first direction, which is the waveguiding direction of the optical waveguide. In addition, the p-type semiconductor layer can be etched through the stripe-shaped masks to form the hole. The hole can therefore be formed uniformly and accurately in the first direction. This reduces an optical propagation loss (scattering) in the optical waveguide due to variations in the shape of the hole.

In the semiconductor optical modulator according to this aspect, the p-type semiconductor layer and the buried layer are preferably composed of the same semiconductor material.

In addition, the semiconductor optical modulator according to this aspect may further include a ridge disposed on the buried layer between the pair of stripe structures, the ridge including the upper cladding layer; a protective layer disposed on the ridge; the protective layer having an opening at a top surface of the ridge. In addition, the n-electrode is disposed on the ridge directly in contact with the top surface of the ridge through the opening.

DESCRIPTION OF THE PREFERRED EMBODIMENTS

Figure 1:
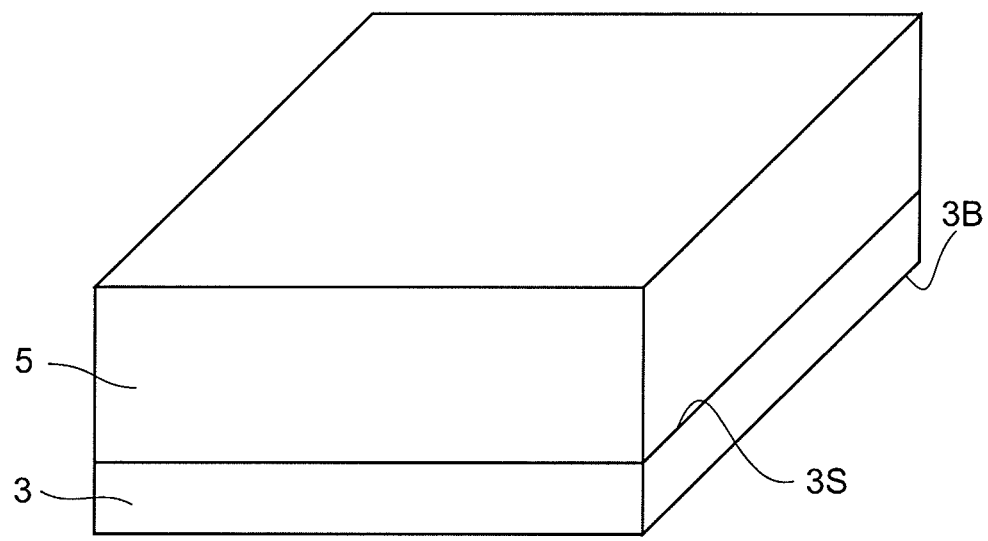
FIG. 1 is a perspective view illustrating a method for manufacturing a semiconductor modulator according to an embodiment.
Figure 1:
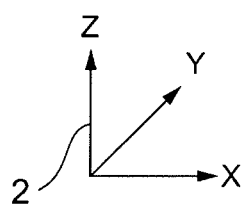

A method for manufacturing a semiconductor optical modulator and a semiconductor optical modulator according to an embodiment will now be described in detail with reference to the accompanying drawings, where like numerals are used for like elements if possible. The elements in the drawings are not drawn to scale for illustrative purposes.

The method for manufacturing a semiconductor modulator according to this embodiment includes a p-type-semiconductor-layer forming step, a stripe-structure forming step, a buried-layer forming step, a core-layer forming step, an upper-cladding-layer forming step, an optical-waveguide processing step, and an electrode-forming step. FIGS. 1 to 15 are perspective views illustrating the method for manufacturing a semiconductor modulator according to this embodiment. The individual steps will now be described in detail with reference to these figures.

P-Type-Semiconductor-Layer Forming Step

The method begins with the p-type-semiconductor-layer forming step. In this step, a p-type semiconductor substrate 3 is prepared first. The p-type semiconductor substrate 3 is formed of, for example, a group III-V compound semiconductor, such as InP, doped with a p-type impurity such as zinc. The semiconductor substrate 3 has a substantially flat main surface 3S and a substantially flat back surface 3B.

Figure 2:
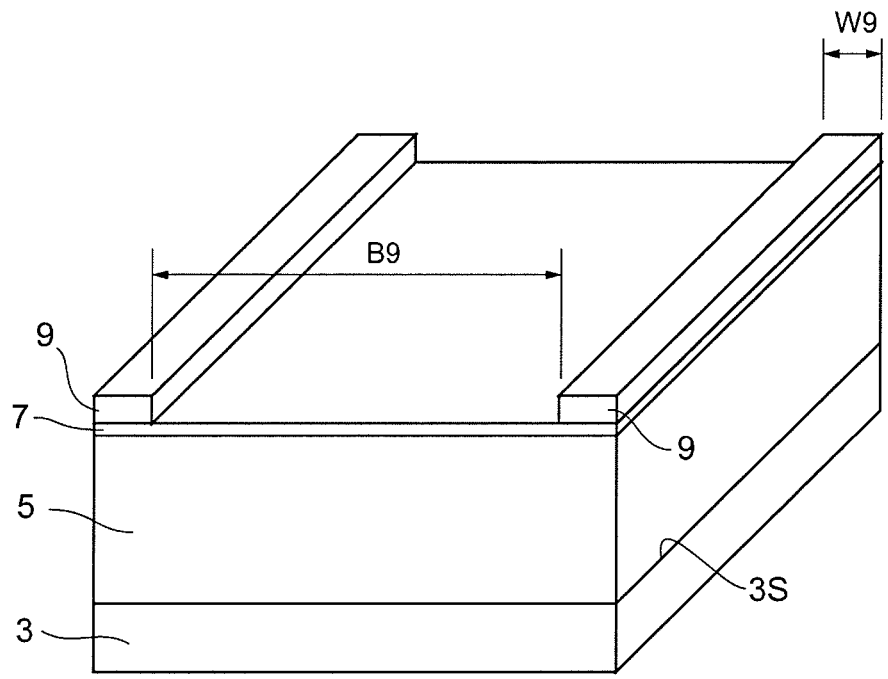
FIG. 2 is a perspective view illustrating the method for manufacturing a semiconductor modulator according to the embodiment.
Figure 2:
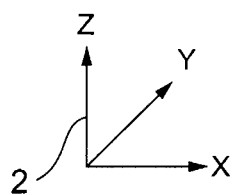

FIG. 1 shows a Cartesian coordinate system 2 where the X- and Y-axes extend parallel to the main surface 3S, and the Z-axis extends across the thickness of the p-type semiconductor substrate 3. FIG. 2 and the subsequent figures show a Cartesian coordinate system 2 corresponding to the one shown in FIG. 1.

As shown in FIG. 1, a p-type semiconductor layer 5 is then formed on the main surface 3S of the p-type semiconductor substrate 3 by, for example, an epitaxial growth process such as metal-organic vapor phase epitaxy (MOVPE). The p-type semiconductor layer 5 is formed of, for example, a group III-V compound semiconductor, such as InP, doped with a p-type impurity such as zinc. The p-type semiconductor layer 5 may have a thickness of, for example, 1.5 to 2.0 μm and a p-type impurity concentration of, for example, $1 \times 10^{18}$ cm$^{-3}$.

Stripe-Structure Forming Step

The stripe-structure forming step is then performed. In this step, referring to FIG. 2, an insulating film 7 is initially formed on the p-type semiconductor layer 5 by, for example, chemical vapor deposition (CVD). The insulating film 7 is formed of a dielectric material such as silicon nitride (SiN) or silicon oxide (SiO$_2$) and has a thickness of, for example, 300 nm. As shown in FIG. 2, a resist pattern 9 is formed on the insulating film 7 by photolithography. The resist pattern 9 is a pattern including a pair of stripes and extending in a first direction along the main surface 3S of the p-type semiconductor substrate 3, namely, in the Y-axis direction. The resist pattern 9 has a width W9 in the X-axis direction of, for example, 1 μm and a length in the Y-axis direction of, for example, 3 to 4 mm. The pair of stripes forming the resist pattern 9 are spaced apart from each other in the X-axis direction. The spacing B9 is larger than the width of a ridge 31 (see FIG. 10), formed in the subsequent steps, in the X-axis direction. For example, the spacing B9 may be 3 μm larger than the width of the ridge 31 in the X-axis direction.

Figure 3:
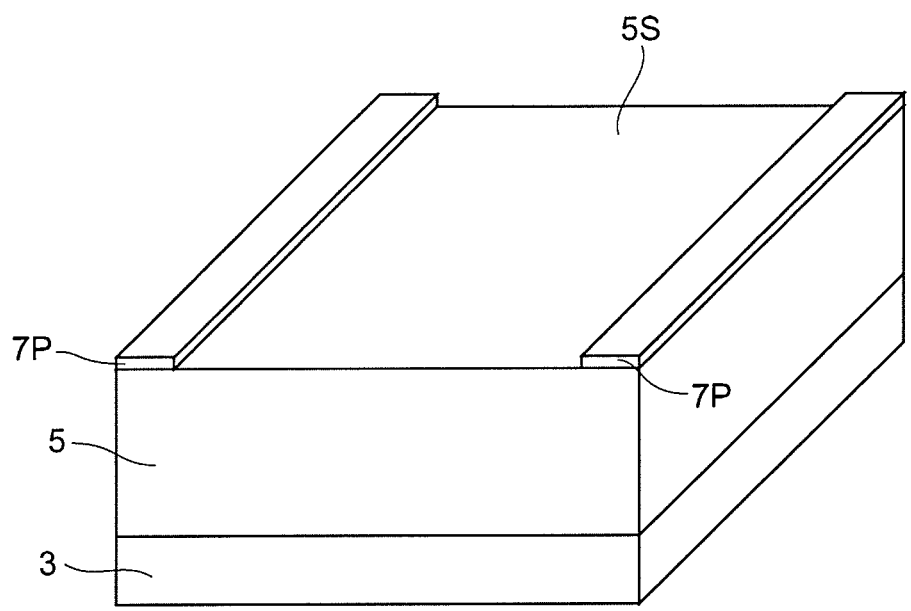
FIG. 3 is a perspective view illustrating the method for manufacturing a semiconductor modulator according to the embodiment.
Figure 3:
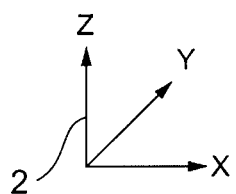

Turning to FIG. 3, the insulating film 7 is etched by, for example, a dry etching process such as reactive ion etching (RIE) using the resist pattern 9 as a mask. The etching gas used for RIE may be, for example, chlorine tetrafluoride (CF$_4$) gas. In this way, the shape of the resist pattern 9 is transferred to the insulating film 7; that is, the insulating film 7 is processed into an insulating film pattern 7P. Thus, a pair of stripe-shaped masks made of the insulating film 7 are formed.

Figure 4:
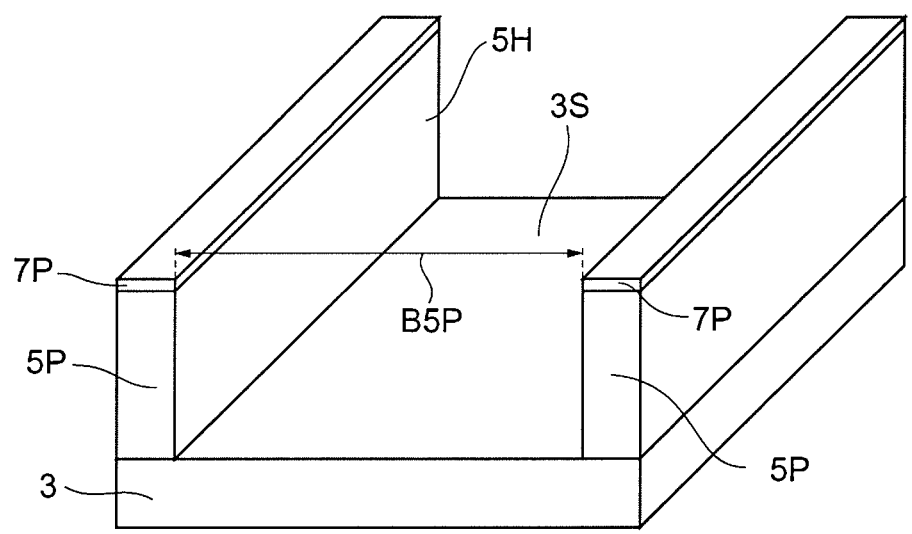
FIG. 4 is a perspective view illustrating the method for manufacturing a semiconductor modulator according to the embodiment.

Turning to FIG. 4, the p-type semiconductor layer 5 is etched from a surface 5S thereof in the Z-axis direction by, for example, a dry etching process such as RIE using the pair of stripe-shaped masks having the insulating film pattern 7P. The etching gas used for RIE may be, for example, Cl$_2$-based gas. In this way, a hole 5H is formed in the p-type semiconductor layer 5. The p-type semiconductor layer 5 is simultaneously processed into a pair of stripe structures 5P. The p-type semiconductor layer 5 may also be etched by wet etching.

The hole 5H is defined by the pair of stripe structures 5P and extends in the Y-axis direction (first direction). Similarly, the pair of stripe structures 5P extend in the Y-axis direction (first direction). The pair of stripe structures 5P protrude in a direction crossing the main surface 3S of the p-type semiconductor substrate 3 (e.g., in the Z-axis direction).

In this embodiment, the p-type semiconductor layer 5 is etched until the main surface 3S of the p-type semiconductor substrate 3 is exposed. In this embodiment, therefore, the height of the hole 5H (the etch depth of the p-type semiconductor layer 5) is substantially equal to the thickness of the p-type semiconductor layer 5, for example, 1.5 to 2.0 μm. The length of the hole 5H along the Y-axis is, for example, 3 to 4 mm. The p-type semiconductor layer 5 may also be etched to the middle position across the thickness of the p-type semiconductor layer 5 such that the main surface 3S of the p-type semiconductor substrate 3 is not exposed.

After the hole 5H is formed as above, the insulating film pattern 7P is removed by, for example, wet etching with buffered hydrofluoric acid (BHF).

Buried-Layer Forming Step

The buried-layer forming step is then performed. This step includes a first-buried-region forming step and a second-buried-region forming step.

First-Buried-Region Forming Step

Figure 5:
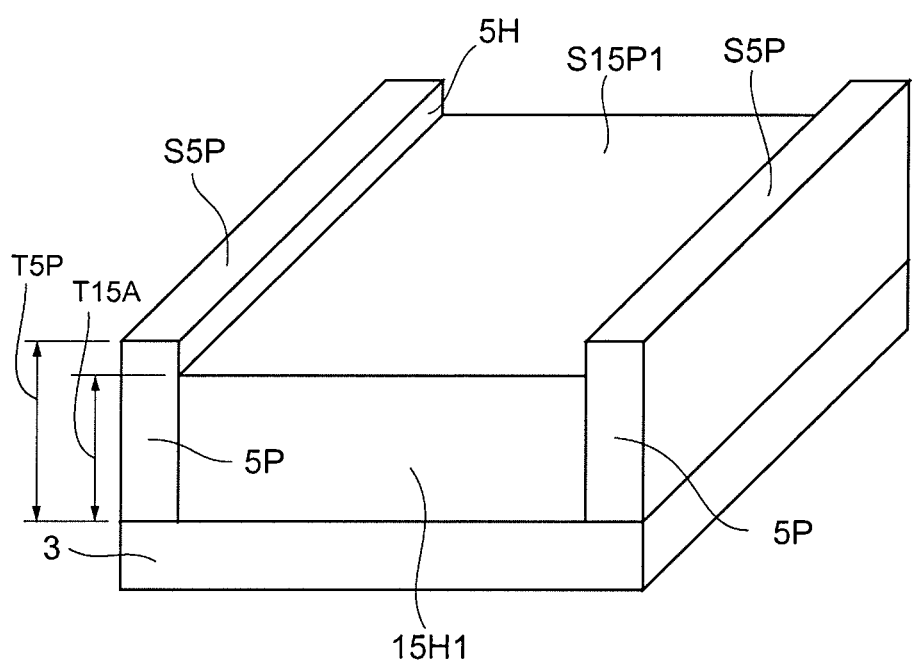
FIG. 5 is a perspective view illustrating the method for manufacturing a semiconductor modulator according to the embodiment.
Figure 5:
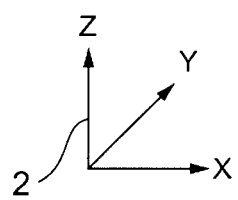

In the first-buried-region forming step, referring to FIG. 5, a first buried region 15P1 is formed on the side surfaces of the hole 5H and the main surface 3S of the p-type semiconductor substrate 3 by, for example, an epitaxial growth process such as MOVPE. The first buried region 15P1 forms a portion of a buried layer 15 (see FIG. 6).

The first buried region 15P1 is preferably formed at a first growth rate higher than a second growth rate, described later. The first growth rate may be, for example, 1.0 to 2.0 μm/h.

In the first-buried-region forming step, the hole 5H is partially filled with the first buried region 15P1. The first buried region 15P1 extends in the Y-axis direction. The height T15A of the first buried region 15P1 is smaller than the height T5P of the pair of stripe structures 5P. That is, the top surface S15P1 of the first buried region 15P1 is lower than the top surfaces S5P of the pair of stripe structures 5P. The height T15A of the first buried region 15P1 is, for example, 1.4 to 1.9 μm.

Second-Buried-Region Forming Step

Figure 6:
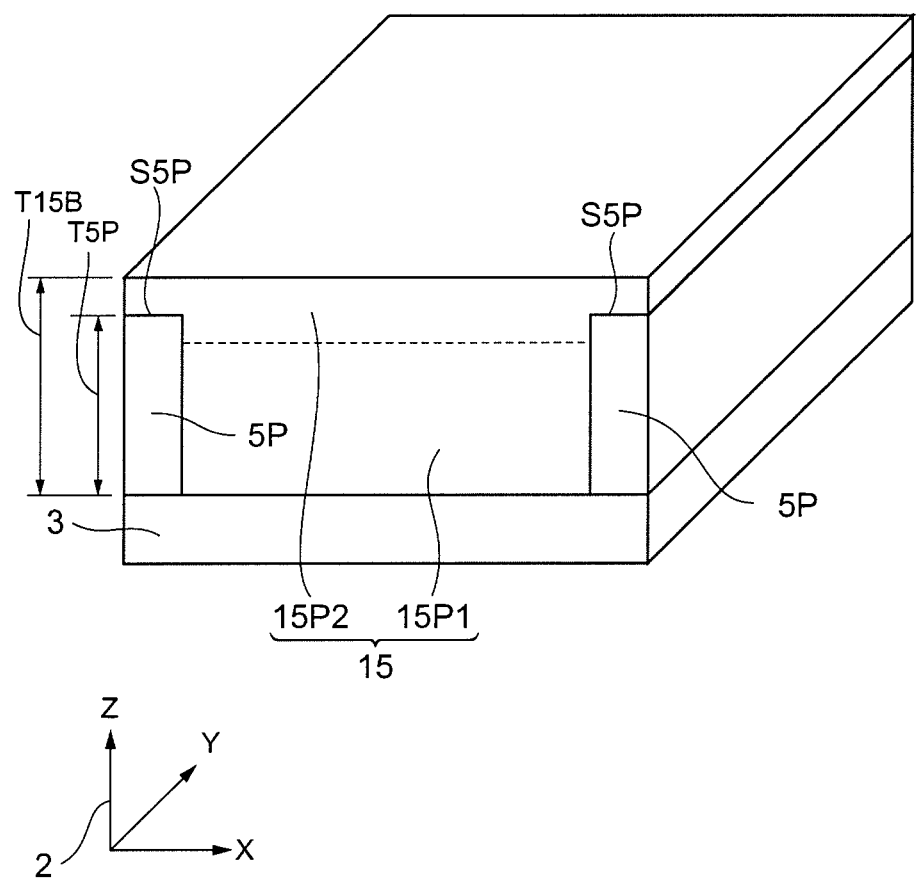
FIG. 6 is a perspective view illustrating the method for manufacturing a semiconductor modulator according to the embodiment.

In the second-buried-region forming step, referring to FIG. 6, a second buried region 15P2 is formed on the first buried region 15P1 by, for example, an epitaxial growth process such as MOVPE. The second buried region 15P2 may be formed of the same material as the first buried region 15P1. In this embodiment, the first buried region 15P1 and the second buried region 15P2 form the buried layer 15. The second buried region 15P2 extends in the Y-axis direction. The buried layer 15 also extends in the Y-axis direction.

The hole 5H is filled with the first buried region 15P1 and the second buried region 15P2 formed on the first buried region 15P1. That is, the hole 5H is completely filled with the buried layer 15.

The second buried region 15P2 is preferably formed at a second growth rate lower than the first growth rate. The second growth rate may be, for example, 0.1 to 0.3 μm/h.

As shown in FIG. 6, the second buried region 15P2 is preferably formed so as to cover the top surfaces S5P of the pair of stripe structures 5P. Thus, a flat buried layer (regrowth interface) is formed on the stripe structures 5P, and accordingly a flat core layer can be formed thereon. In this case, the height T15B of the buried layer 15 is larger than the height T5P of the pair of stripe structures 5P. The height T15B of the buried layer 15 is, for example, 1.6 to 2.1 μm.

The buried layer 15 is formed of an undoped semiconductor material. Alternatively, the buried layer 15 may be formed of a p-type semiconductor material having a lower p-type impurity concentration than the p-type semiconductor layer 5 (see FIGS. 1 to 3) or an n-type semiconductor material having an n-type impurity concentration of $1 \times 10^{17}$ cm$^{-3}$ or less. For example, the buried layer 15 is formed of a group III-V compound semiconductor such as InP. The buried layer 15 can be assumed to be formed of an undoped semiconductor material if it has an impurity concentration of $5 \times 10^{16}$ cm$^{-3}$ or less. The buried layer 15 is preferably formed of the same semiconductor material as the p-type semiconductor layer 5. However, the buried layer 15 may be formed of a different semiconductor material from the p-type semiconductor layer 5.

In this way, the buried layer 15 is formed in the hole 5H.

Core-Layer Forming Step and Upper-Cladding-Layer Forming Step

The core-layer forming step and the upper-cladding-layer forming step are then performed. In these steps, a stack layer including a core layer and an upper cladding layer is formed on the buried layer 15.

Figure 7:
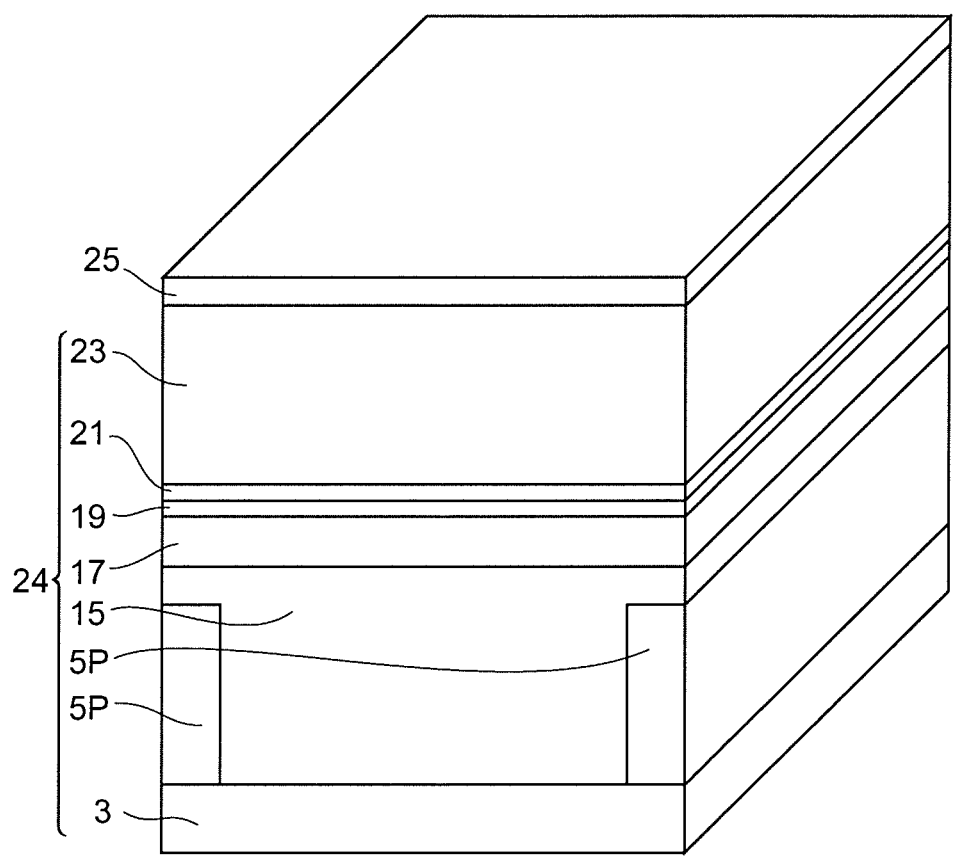
FIG. 7 is a perspective view illustrating the method for manufacturing a semiconductor modulator according to the embodiment.

Specifically, referring to FIG. 7, a core layer 17, a semiconductor layer 19, an etch stop layer 21, an upper cladding layer 23, and a contact layer 25 are formed, in this order, on the buried layer 15 by, for example, an epitaxial growth process such as MOVPE.

The core layer 17 is formed of a semiconductor material having a higher refractive index than the buried layer 15 and the p-type semiconductor substrate 3. The buried layer 15 and the p-type semiconductor substrate 3 therefore function as a lower cladding for the core layer 17.

The core layer 17 has, for example, a multiple quantum well (MQW) structure with well layers and barrier layers alternately stacked to each other. The core layer 17 may have a single quantum well (SQW) structure. The core layer 17 is formed of, for example, a group III-V compound semiconductor such as AlGaInAs. The core layer 17 has a thickness of, for example, 0.3 to 0.5 μm.

The semiconductor layer 19 is formed of, for example, an undoped group III-V compound semiconductor such as InP. The semiconductor layer 19 has a thickness of, for example, 100 to 200 nm. The semiconductor layer 19 can reduce free carrier absorption, thus reducing an optical loss in the optical waveguide.

The etch stop layer 21 is formed of a different semiconductor material from the upper cladding layer 23. For example, the etch stop layer 21 is formed of an n-type group III-V compound semiconductor such as GaInAsP. The etch stop layer 21 provides an etch stop function in the optical-waveguide processing step, described later (see FIG. 10). The etch stop layer 21 has a thickness of, for example, 30 to 50 nm.

The upper cladding layer 23 is formed of an n-type semiconductor material, for example, an n-type group III-V compound semiconductor such as InP. The semiconductor material of the upper cladding layer 23 has a lower refractive index than that of the core layer 17. The upper cladding layer 23 has a thickness of, for example, 1.5 to 2.0 μm.

The contact layer 25 is formed of an n-type semiconductor material, for example, an n-type group III-V compound semiconductor such as GaInAs. The contact layer 25 has a thickness of, for example, 300 nm.

In this way, a stack including the core layer 17 and the upper cladding layer 23 is formed on the buried layer 15, thus forming an optical waveguide 24 including the p-type semiconductor substrate 3, the pair of stripe structures 5P, the buried layer 15, the core layer 17, the semiconductor layer 19, the etch stop layer 21, and the upper cladding layer 23. The optical waveguide 24 extends in the first direction (Y-axis direction). Accordingly, light propagates through the core layer 17 in the optical waveguide 24 in the first direction.

Optical-Waveguide Processing Step

Figure 8:
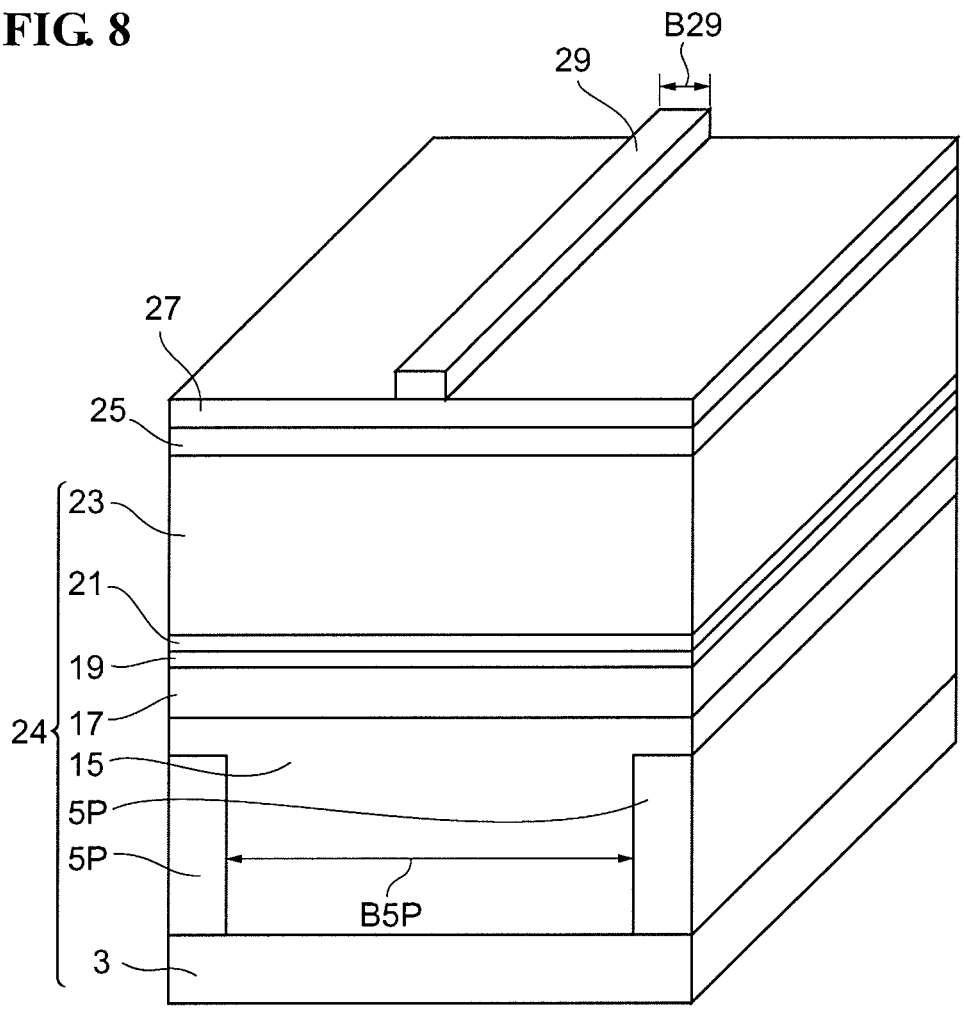
FIG. 8 is a perspective view illustrating the method for manufacturing a semiconductor modulator according to the embodiment.

The optical-waveguide processing step is then performed. In this step, referring to FIG. 8, an insulating film 27 is formed on the contact layer 25 by, for example, CVD. The insulating film 27 is formed of a dielectric material such as SiN or $SiO_2$ and has a thickness of, for example, 300 nm. As shown in FIG. 8, a resist pattern 29 is formed on the insulating film 27 by photolithography.

The resist pattern 29 extends in the Y-axis direction. The width B29 of the resist pattern 29 in the X-axis direction is smaller than the spacing B5P between the pair of stripe structures 5P. The resist pattern 29 is disposed above the region of the buried layer 15 between the pair of stripe structures 5P.

Figure 9:
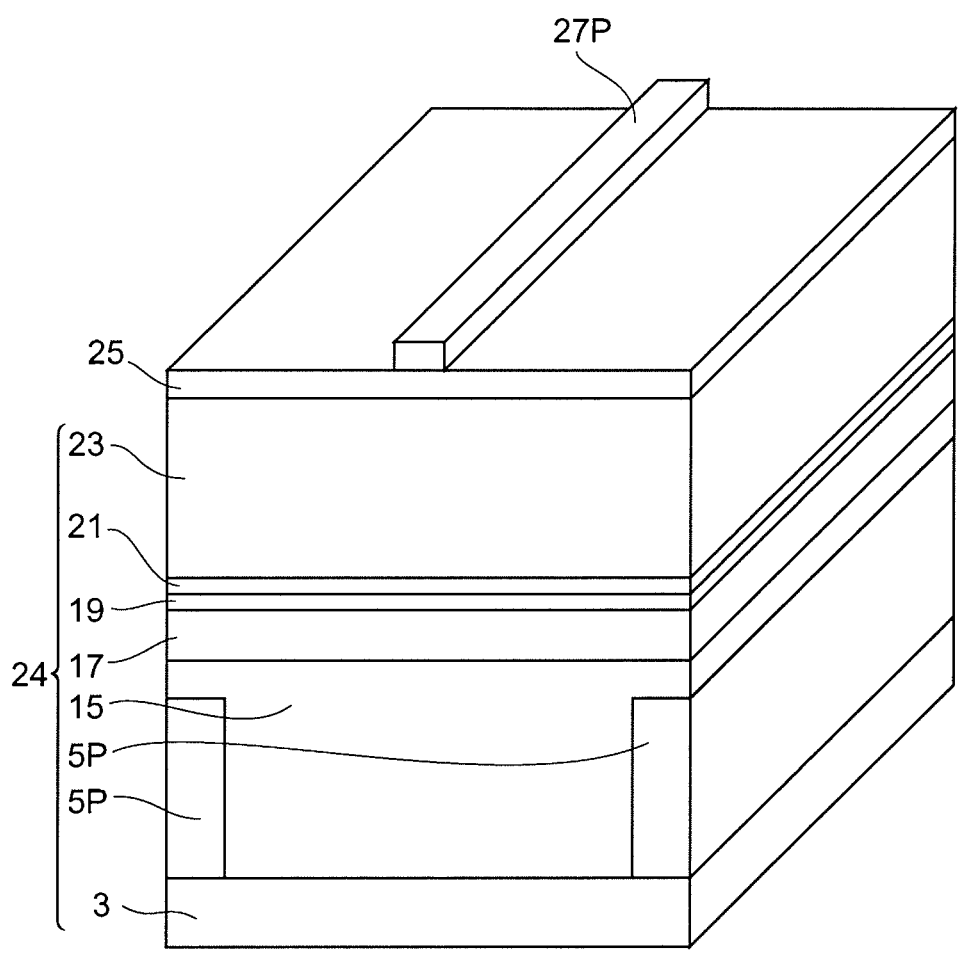
FIG. 9 is a perspective view illustrating the method for manufacturing a semiconductor modulator according to the embodiment.

Turning to FIG. 9, the insulating film 27 is etched by, for example, a dry etching process such as RIE using the resist pattern 29 as a mask. The etching gas used for RIE may be, for example, $CF_4$ gas. Thus, the shape of the resist pattern 29 is transferred to the insulating film 27. In this way, the insulating film 27 is processed into an insulating film pattern 27P.

Figure 10:
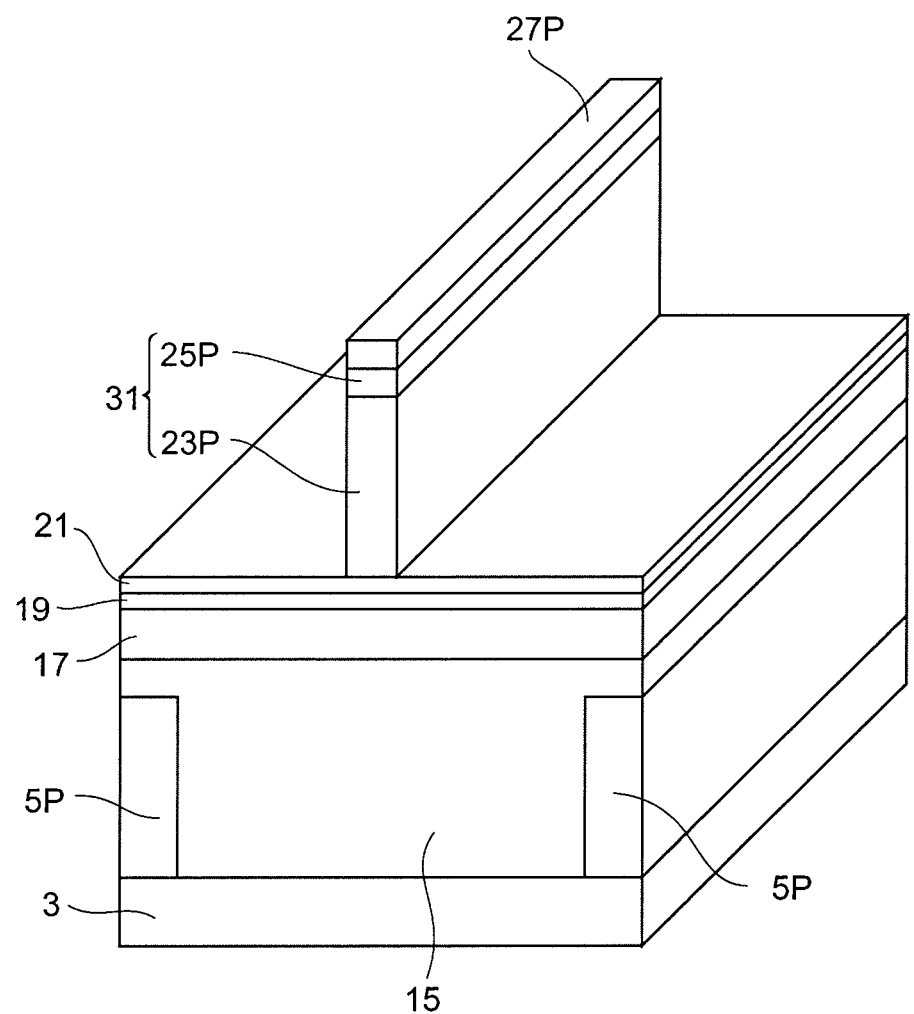
FIG. 10 is a perspective view illustrating the method for manufacturing a semiconductor modulator according to the embodiment.

Turning to FIG. 10, the entire contact layer 25 and a portion of the upper cladding layer 23 are etched by, for example, a dry etching process such as RIE using the insulating film pattern 27P as a mask. The etching gas used for RIE may be, for example, $Cl_2$-based gas. The remaining portion of the upper cladding layer 23 is then etched by wet etching with, for example, HCl. This wet etching removes a damaged layer formed in the upper cladding layer 23. The damaged layer is formed when the entire contact layer 25 and a portion of the upper cladding layer 23 is etched by dry etching process. In this wet etching process with HCl as an etchant, the etching rate of the etch stop layer 21, which is formed of, for example, GaInAsP, is lower than that of the upper cladding layer 23, which is formed of, for example, InP. Therefore, the etch stop layer 21 can provide an etch stop function in the etching of the remaining upper cladding layer 23.

In this way, the shape of the insulating film 27 is transferred to the contact layer 25 and the upper cladding layer 23. As a result, the contact layer 25 is processed into a stripe-shaped contact layer 25P, and the upper cladding layer 23 is processed into a stripe-shaped upper cladding layer 23P. Thus, a stripe-shaped ridge 31 including the stripe-shaped upper cladding layer 23P and the stripe-shaped contact layer 25P is formed in the optical waveguide 24. The ridge 31 extends in the Y-axis direction and protrudes in the Z-axis direction. The ridge 31 is formed above the region of the buried layer 15 between the pair of stripe structures 5P. The width of the ridge 31 in the X-axis direction is smaller than the spacing B5P between the pair of stripe structures 5P.

After the ridge 31 is formed as above, the insulating film pattern 27P is removed by, for example, wet etching with BHF.

Electrode-Forming Step

The electrode-forming step is then performed. In this step, an n-electrode that forms an ohmic contact with the contact layer 25 (stripe-shaped contact layer 25P) is formed on the top surface of the ridge 31, and a p-electrode that forms an ohmic contact with the p-type semiconductor substrate 3 is formed on the back surface 3B of the p-type semiconductor substrate 3.

Figure 11:
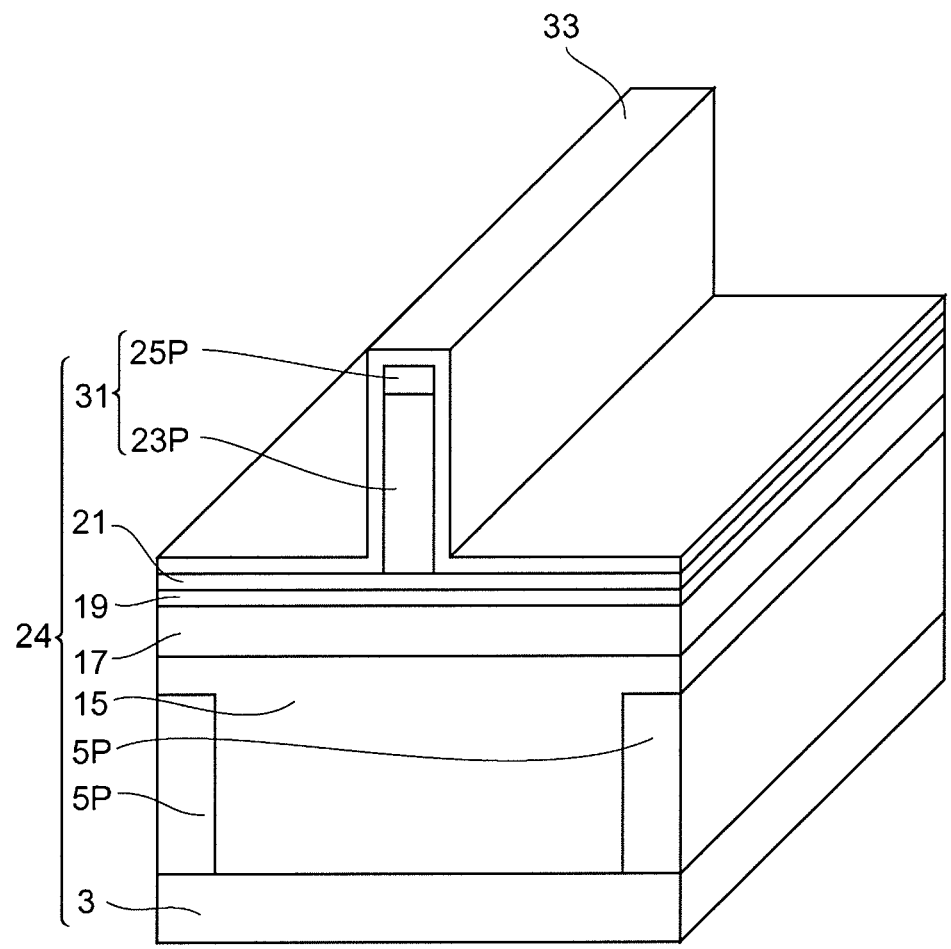
FIG. 11 is a perspective view illustrating the method for manufacturing a semiconductor modulator according to the embodiment.

Specifically, referring to FIG. 11, a protective layer 33 is formed on the exposed surface of the etch stop layer 21 and the exposed surface of the ridge 31 by, for example, CVD. The protective layer 33 is formed of a dielectric material such as $SiO_2$ or SiN.

Figure 12:
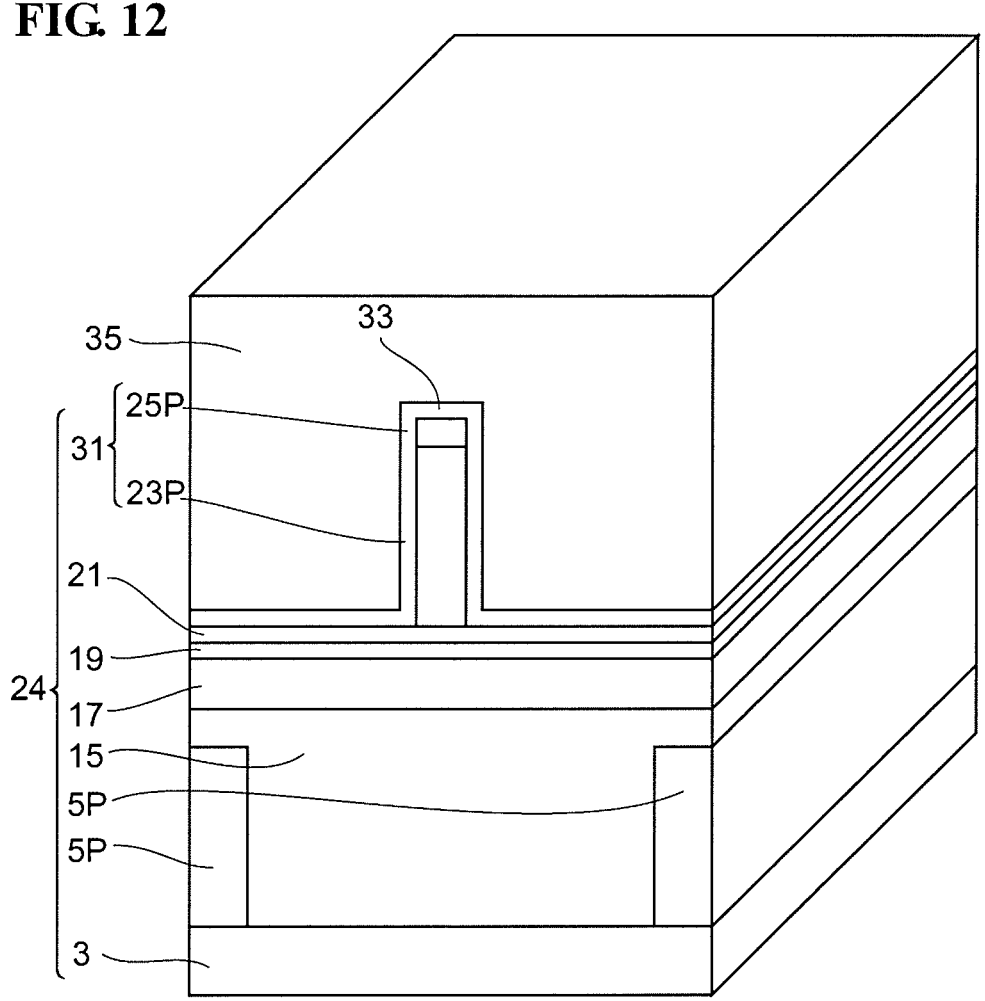
FIG. 12 is a perspective view illustrating the method for manufacturing a semiconductor modulator according to the embodiment.

Turning to FIG. 12, a resin part 35 is formed on the protective layer 33 so as to bury the ridge 31. The resin part 35 is formed by, for example, a spin-coating method. The resin part 35 is formed of, for example, benzocyclobutene (BCB) resin.

Figure 13:
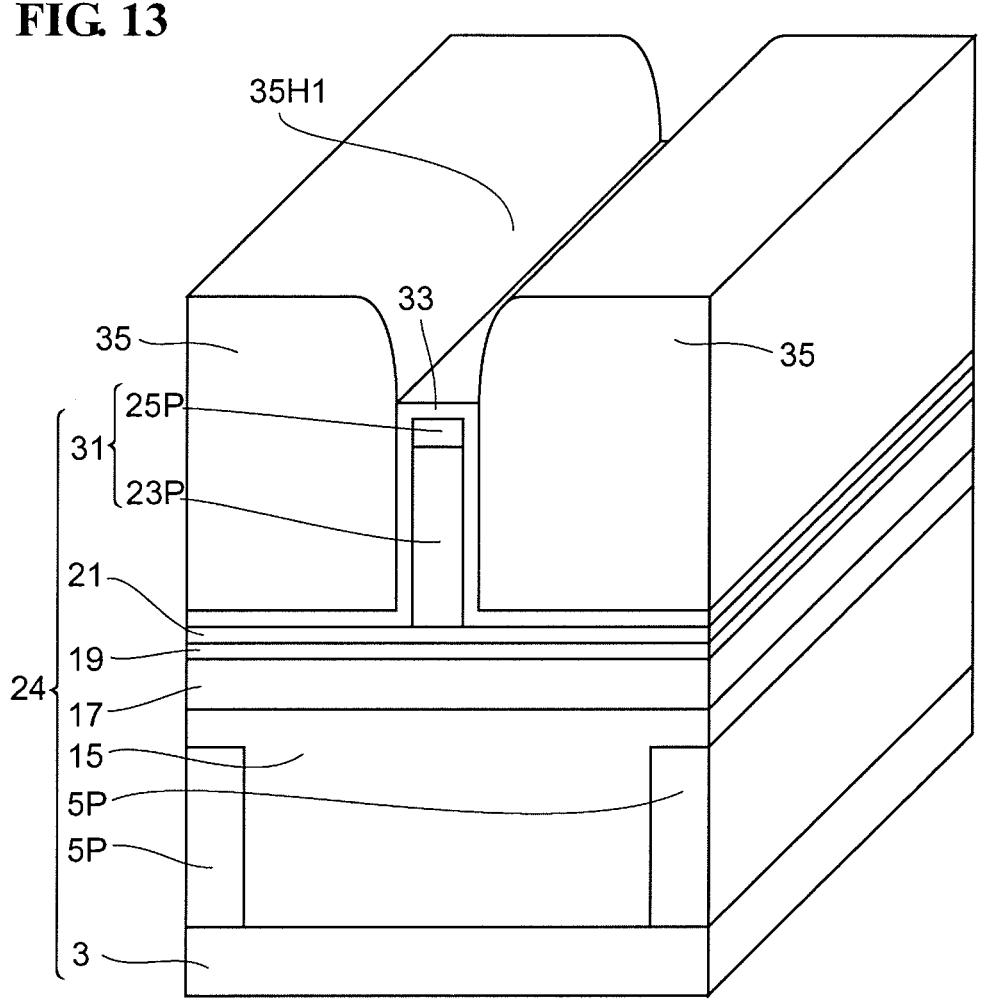
FIG. 13 is a perspective view illustrating the method for manufacturing a semiconductor modulator according to the embodiment.
Figure 13:
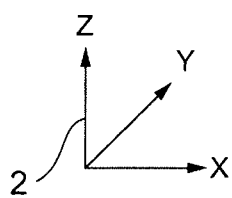

Turning to FIG. 13, an opening 35H1 extending in the Y-axis direction is formed in the resin part 35. This opening 35H1 exposes the region of the protective layer 33 above the ridge 31. The opening 35H1 is formed above the region of the buried layer 15 between the pair of stripe structures 5P. The opening 35H1 is formed by partially etching the resin part 35 by, for example, RIE using a gas mixture of $CF_4$ and oxygen ($O_2$) as an etching gas.

Figure 14:
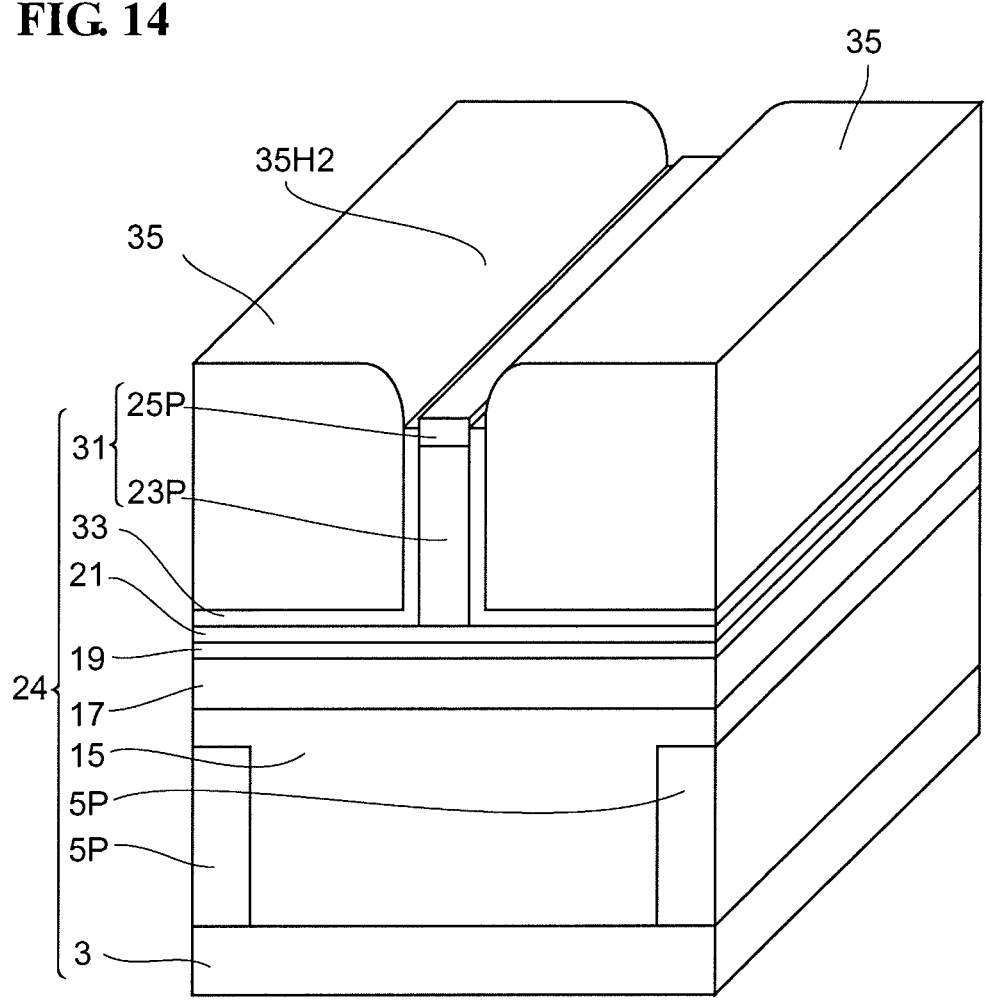
FIG. 14 is a perspective view illustrating the method for manufacturing a semiconductor modulator according to the embodiment.

Turning to FIG. 14, the portion of the protective layer 33 exposed in the opening 35H1 is etched by, for example, RIE with $CF_4$ gas to expose the contact layer 25P. The resin part 35 then functions as a mask. This etching forms an opening 35H2 extending in the Y-axis direction in the protective layer 33.

Figure 15:
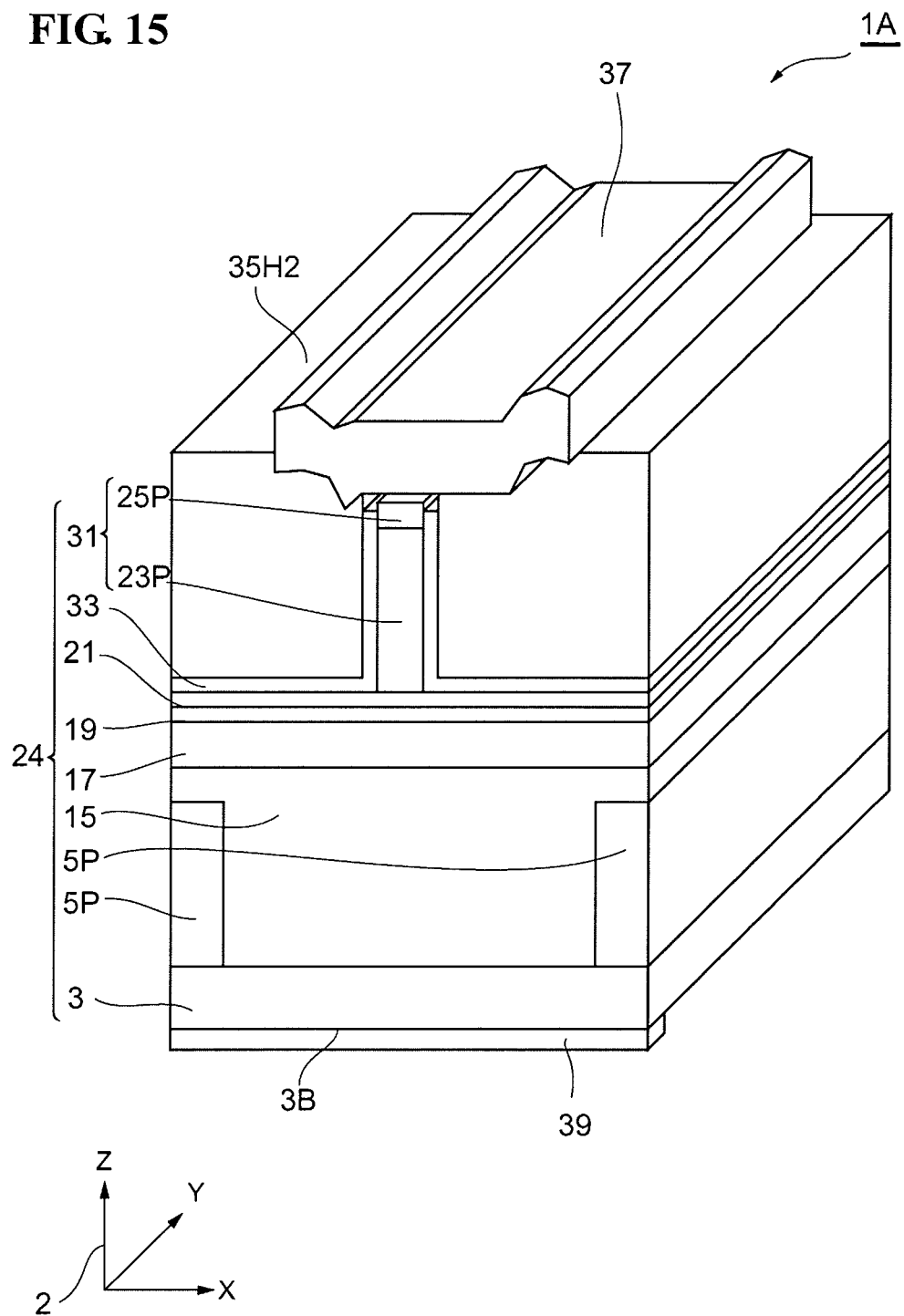
FIG. 15 is a perspective view illustrating the method for manufacturing a semiconductor modulator according to the embodiment.

Turning to FIG. 15, an ohmic electrode 37 is formed in direct contact with the stripe-shaped contact layer 25P in the ridge waveguide 24 through the opening 35H2. In addition, an ohmic electrode 39 is formed in direct contact the back surface 3B of the p-type semiconductor substrate 3. In this way, a semiconductor modulator 1A according to this embodiment is completed. This semiconductor modulator 1A allows light incident on one end surface thereof in the Y-axis direction to propagate to the other end surface in the Y-axis direction. During the propagation, the refractive index of the optical waveguide 24 is changed by applying a high-frequency signal voltage between the electrodes 37 and 39 of the semiconductor modulator 1A. The light propagating through the semiconductor modulator 1A is then modulated depending on the high-frequency signal voltage. The semiconductor modulator 1A thus functions as an optical modulator.

Figure 16:
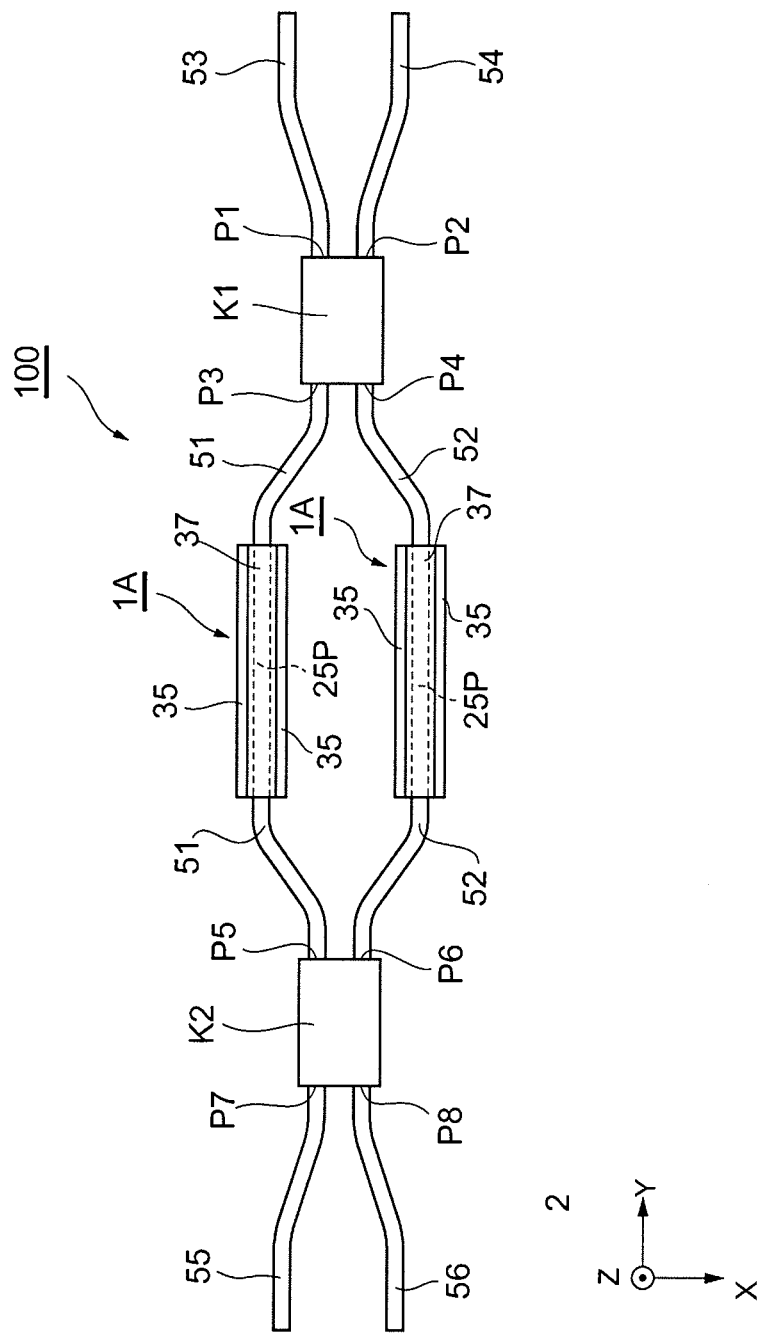
FIG. 16 is a schematic plan view showing the configuration of the Mach-Zehnder type semiconductor optical modulator.

Next, an example of a Mach-Zehnder (MZ) type optical modulator including semiconductor modulators 1A according to this embodiment will be described. FIG. 16 is a schematic plan view showing the configuration of the Mach-Zehnder type optical modulator.

Referring to FIG. 16, a Mach-Zehnder type optical modulator 100 includes a first arm 51, a second arm 52, a third arm 53, a fourth arm 54, a fifth arm 55, a sixth arm 56, a first multi-mode interference (MMI) coupler K1, and a second MMI coupler K2. The first arm 51 includes a semiconductor modulator 1A. The second arm 52 includes another semiconductor modulator 1A. The first MMI coupler K1 has two optical input ports P1 and P2 and two optical output ports P3 and P4. The second MMI coupler K2 has two optical input ports P5 and P6 and two optical output ports P7 and P8.

One end of the first arm 51 is connected to one of the two optical output ports P3 and P4 of the first MMI coupler K1, namely, the optical output port P3. The other end of the first arm 51 is connected to one of the two optical input ports P5 and P6 of the second MMI coupler K2, namely, the optical input port P5. One end of the second arm 52 is connected to the other of the two optical output ports P3 and P4 of the first MMI coupler K1, namely, the optical output port P4. The other end of the second arm 52 is connected to the other of the two optical input ports P5 and P6 of the second MMI coupler K2, namely, the optical input port P6. One end of the third arm 53 extends to one end of the Mach-Zehnder type optical modulator 100. The other end of the third arm 53 is connected to one of the two optical input ports P1 and P2 of the first MMI coupler K1, namely, the optical input port P1. One end of the fourth arm 54 extends to the end of the Mach-Zehnder type optical modulator 100. The other end of the fourth arm 54 is connected to the other of the two optical input ports P1 and P2 of the first MMI coupler K1, namely, the optical input port P2. One end of the fifth arm 55 is connected to one of the two optical output ports P7 and P8 of the second MMI coupler K2, namely, the optical output port P7. The other end of the fifth arm 55 extends to the other end of the Mach-Zehnder type optical modulator 100. One end of the sixth arm 56 extends to the other end of the Mach-Zehnder type optical modulator 100. The other end of the sixth arm 56 is connected to the other of the two optical output ports P7 and P8 of the second MMI coupler K2, namely, the optical output port P8.

In the method for manufacturing a semiconductor optical modulator, described above, according to this embodiment, the hole 5H is formed in the p-type semiconductor layer 5 in the stripe-structure forming step, and the buried layer 15 is formed in the hole 5H in the buried-layer forming step (see FIGS. 2 to 6). The buried layer 15 is formed of an undoped semiconductor material. Alternatively, the buried layer 15 may be formed of a p-type semiconductor material having a lower p-type impurity concentration than the p-type semiconductor layer 5 or an n-type semiconductor material having an n-type impurity concentration of $1 \times 10^{17}$ cm$^{-3}$ or less.

As compared to the method of forming stacked layers including the core layer 17 directly on the p-type semiconductor layer 5 without forming the hole 5H and the buried layer 15, the above method for manufacturing a semiconductor optical modulator according to this embodiment has the following feature. That is, for example, when the buried layer 15 is formed of an undoped semiconductor material or an n-type semiconductor material having an n-type impurity concentration of $1 \times 10^{17}$ cm$^{-3}$ or less, it reduces the p-type semiconductor material region (the p-type semiconductor layer 5 in the above embodiment). When the buried layer 15 is formed of a p-type semiconductor material having a lower p-type impurity concentration than the p-type semiconductor layer 5, it reduces the p-type impurity concentration. As a result, an optical absorption loss of an optical waveguide 24 in a semiconductor modulator 1A is reduced for light propagating in the core layer 17. Therefore, a semiconductor modulator 1A including the optical waveguide 24 with a low optical loss (see FIG. 15) is obtained.

In the method for manufacturing a semiconductor optical modulator according to this embodiment, the p-type semiconductor layer 5 is etched from the surface 5S thereof by, for example, dry etching to form the hole 5H (see FIGS. 3 and 4) through the stripe shaped masks having the insulating film pattern 7P. A shape of hole can be controlled by the pattern of stripe-shaped mask. In addition, the p-type semiconductor layer 5 is etched in a depth direction (Z-axis direction) perpendicular to the first direction (Y-axis direction), which is the waveguiding direction of the optical waveguide 24. This etching process can form the hole 5H extending in the first direction (Y-axis direction) uniformly and accurately in the first direction (Y-axis direction) (see FIGS. 3 and 4), thus reducing an optical loss (scattering) in the optical waveguide 24 due to variations in the shape of the hole 5H compared to the method of forming the hole by wet etching.

Thus, the method for manufacturing a semiconductor optical modulator according to this embodiment provides a semiconductor modulator 1A with a reduced optical loss.

In the method for manufacturing a semiconductor optical modulator according to this embodiment, the buried-layer forming step includes the first-buried-region forming step, in which a portion (first buried region 15P1) of the buried layer 15 is formed in the hole 5H at the first growth rate, and the second-buried-region forming step, in which the other portion (second buried region 15P2) of the buried layer 15 is formed on the portion (first buried region 15P1) of the buried layer 15 at the second growth rate. The second growth rate is lower than the first growth rate (see FIGS. 5 and 6). This improves the surface flatness of the layers forming the buried layer 15, thus further reducing an optical loss in the optical waveguide 24.

In the method for manufacturing a semiconductor optical modulator according to this embodiment, the buried layer 15 is formed in the buried-layer forming step so as to fill the hole 5H and to cover the top surfaces S5P of the pair of stripe structures 5P (see FIG. 6). Thus, a flat buried layer (regrowth interface) is formed on the stripe structures 5P. Accordingly, a flat core layer 17 can be formed on the buried layer 15.

The semiconductor optical modulator 1A, described above, according to this embodiment includes the pair of stripe structures 5P and the buried layer 15 disposed in the hole 5H. The pair of stripe structures 5P is formed of the p-type semiconductor layer 5. In addition, the pair of stripe structures 5P defines the hole 5H. The pair of stripe structures 5P and the buried layer 15 are disposed on the p-type semiconductor substrate 3 (see FIG. 15). The buried layer 15 is formed of an undoped semiconductor material, a p-type semiconductor material having a lower p-type impurity concentration than the p-type semiconductor layer 5, or an n-type semiconductor material having an n-type impurity concentration of $1 \times 10^{17}$ cm$^{-3}$ or less.

When the buried layer 15 is formed of an undoped semiconductor material or an n-type semiconductor material having an n-type impurity concentration of $1 \times 10^{17}$ cm$^{-3}$ or less, it reduces the p-type semiconductor material region (the p-type semiconductor layer 5 in the above embodiment). When the buried layer 15 is formed of a p-type semiconductor material having a lower p-type impurity concentration than the p-type semiconductor layer 5, it reduces the p-type impurity concentration. In general, a p-type semiconductor material has a larger optical absorption loss than that of an n-type semiconductor material due to intervalence band absorption. As a result, an optical absorption loss of the optical waveguide 24 is reduced for light propagating in the core layer 17. When the buried layer 15 is formed of an n-type semiconductor material, the optical waveguide 24 with a sufficiently low optical loss is obtained because the n-type impurity concentration thereof is $1 \times 10^{17}$ cm$^{-3}$ or less.

In the semiconductor modulator 1A according to this embodiment, the p-type semiconductor layer 5 with uniform thickness is formed on the p-type semiconductor substrate 3 and is etched by, for example, dry etching in a direction (Z-axis direction) perpendicular to the first direction (Y-axis direction), which is the waveguiding direction of the optical waveguide 24, to form the hole 5H (see FIGS. 1 to 4). Thus, the hole 5H is formed with uniform shape in the first direction (Y-axis direction) (see FIGS. 3 and 4). This reduces an optical loss in the optical waveguide 24 resulting from light scattering due to variations in the shape of the hole 5H.

Thus, the semiconductor modulator 1A according to this embodiment has a low optical loss for light propagating in the core layer 17.

The present invention is not limited to the above embodiment; various modifications are permitted.

For example, while the semiconductor layer 19 and the etch stop layer 21 are formed on the buried layer 15 in the above embodiment (see FIG. 7), the semiconductor layer 19 and/or the etch stop layer 21 may be omitted.

In the above embodiment, the buried layer 15 is formed so as to cover the top surfaces S5P of the pair of stripe structures 5P in the buried-layer forming step (see FIG. 6). The buried layer 15, however, may be formed only in the hole 5H so as not to cover the top surfaces S5P of the pair of stripe structures 5P. In this case, the core layer 17 directly contacts both the buried layer 15 and the pair of stripe structures 5P (see FIG. 7).

Figure 17:
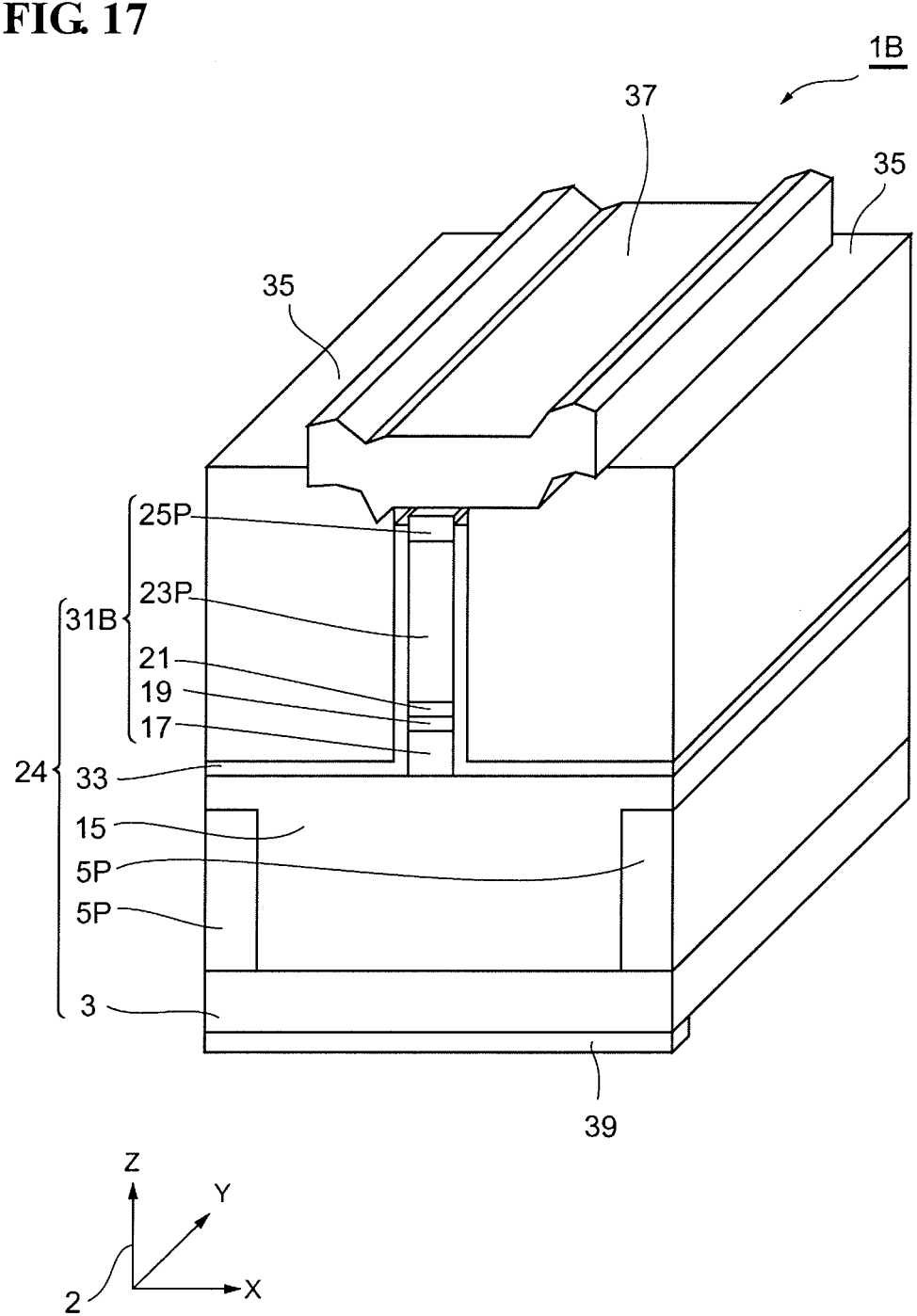
FIG. 17 is a perspective view of a semiconductor modulator according to a modification.

In the above embodiment, the optical waveguide 24 is partially processed into a ridge shape in the optical-waveguide processing step by etching the layers from the top layer of the optical waveguide 24 (the contact layer 25 in the above embodiment) to a layer above the core layer 17 (the etch stop layer 21 in the above embodiment) (see FIGS. 8 to 10). In the optical-waveguide processing step, however, the layers from the top layer of the optical waveguide 24 to a layer below the core layer 17 (for example, the buried layer 15) may be etched. FIG. 17 shows a perspective view of a semiconductor modulator according to such a modification. For a semiconductor modulator 1B, shown in FIG. 17, according to this modification, the layers from the top layer of the optical waveguide 24, namely, the contact layer 25, to a layer below the core layer 17, namely, the buried layer 15, are etched in the optical-waveguide processing step. Thus, a portion of the optical waveguide 24 is processed into a mesa portion 31B. The method for manufacturing the semiconductor modulator 1B according to this modification provides a semiconductor modulator 1B including an optical waveguide with a low optical loss for the same reason as the above method for manufacturing the semiconductor modulator 1A.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of Claims are claimed as the present invention.

What is claimed is:

1. A method for manufacturing a semiconductor optical modulator, the method comprising the steps of:
    forming a p-type semiconductor layer on a main surface of a p-type semiconductor substrate;
    forming a pair of stripe-shaped masks on the p-type semiconductor layer, the stripe-shaped masks extending in a first direction along the main surface of the p-type semiconductor substrate and being spaced apart from each other;
    simultaneously forming a hole extending in the first direction and a pair of stripe structures extending in the first direction by etching the p-type semiconductor layer through the stripe-shaped masks, the pair of stripe structures defining the hole and protruding in a direction crossing the main surface of the p-type semiconductor substrate;
    after removing the stripe-shaped masks, forming a buried layer in the hole;
    forming a core layer on the buried layer and the stripe structures, the core layer being made of a semiconductor material having a higher refractive index than the buried layer; and
    forming an upper cladding layer on the core layer, the upper cladding layer being made of an n-type semiconductor material having a lower refractive index than the core layer,
    wherein the buried layer is made of a semiconductor material with a lower optical absorption loss than that of the p-type semiconductor layer.

2. The method for manufacturing a semiconductor optical modulator according to claim 1, wherein the buried layer is made of an undoped semiconductor material, a p-type semiconductor material having a lower p-type impurity concentration than the p-type semiconductor layer, or an n-type semiconductor material having an n-type impurity concentration of $1 \times 10^{17}$ cm$^{-3}$ or less.

3. The method for manufacturing a semiconductor optical modulator according to claim 1, wherein the p-type semiconductor layer and the buried layer are made of the same semiconductor material.

4. The method for manufacturing a semiconductor optical modulator according to claim 1, wherein the p-type semiconductor substrate, the p-type semiconductor layer, and the buried layer are made of InP.

5. The method for manufacturing a semiconductor optical modulator according to claim 1, wherein, in the step of forming the hole and the pair of stripe structures, the p-type semiconductor layer is etched by a reactive ion etching.

6. The method for manufacturing a semiconductor optical modulator according to claim 1, further comprising a step of forming an n-electrode on the upper cladding layer and a p-electrode on a back surface of the p-type semiconductor substrate.

7. The method for manufacturing a semiconductor optical modulator according to claim 1, wherein the step of forming the buried layer includes:
    a step of forming a first buried region having a height smaller than that of the stripe structure on a side surface of the hole and the main surface of the p-type semiconductor substrate at a first growth rate; and
    a step of forming a second buried region on the first buried region at a second growth rate lower than the first growth rate,
    wherein the second buried region fills the hole and covers top surfaces of the pair of stripe structures.

8. The method for manufacturing a semiconductor optical modulator according to claim 1, wherein the buried layer fills the hole and covers top surfaces of the pair of stripe structures in the step of forming the buried layer.

9. The method for manufacturing a semiconductor optical modulator according to claim 1, further comprising the steps of:
    forming a ridge on the buried layer between the pair of stripe structures by etching the upper cladding layer, the ridge having a smaller width than a spacing between the pair of stripe structures;
    forming a protective layer on the ridge;
    forming an opening in the protective layer at a top surface of the ridge; and
    forming an n-electrode in the opening directly in contact with the top surface of the ridge.

10. A semiconductor optical modulator comprising:
    a p-type semiconductor substrate;
    a pair of stripe structures disposed on a main surface of the p-type semiconductor substrate, the pair of stripe structures extending in a first direction along the main surface of the p-type semiconductor substrate and protruding in a direction crossing the main surface of the p-type semiconductor substrate, the pair of stripe structures comprising a p-type semiconductor layer;

a buried layer disposed in a hole defined by the pair of stripe structures, the buried layer comprising a semiconductor material with a lower optical absorption loss than that of the p-type semiconductor layer;

a core layer disposed on the buried layer, the core layer comprising a semiconductor material having a higher refractive index than the buried layer;

an upper cladding layer disposed on the core layer, the upper cladding layer comprising an n-type semiconductor material having a lower refractive index than the core layer;

an n-electrode disposed on the upper cladding layer; and a p-electrode disposed on a back surface of the p-type semiconductor substrate.

11. The semiconductor optical modulator according to claim 10, wherein the buried layer is composed of an undoped semiconductor material, a p-type semiconductor material having a lower p-type impurity concentration than the p-type semiconductor layer, or an n-type semiconductor material having an n-type impurity concentration of $1 \times 10^{17}$ cm$^{-3}$ or less.

12. The semiconductor optical modulator according to claim 10, wherein the p-type semiconductor layer and the buried layer are composed of the same semiconductor material.

13. The semiconductor optical modulator according to claim 10, further comprising:

a ridge disposed on the buried layer between the pair of stripe structures, the ridge including the upper cladding layer; and a protective layer disposed on the ridge, the protective layer having an opening at a top surface of the ridge, wherein the n-electrode is disposed on the ridge directly in contact with the top surface of the ridge through the opening.

* * * * *